United States Patent
Sambongi (10) Patent No.: US 9,658,367 B2
(45) Date of Patent: May 23, 2017

(54) IMAGE ACQUISITION APPARATUS

(71) Applicant: OLYMPUS CORPORATION, Shibuya-ku, Tokyo (JP)

(72) Inventor: Masao Sambongi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 224 days.

(21) Appl. No.: 14/335,370

(22) Filed: Jul. 18, 2014

(65) Prior Publication Data

US 2014/0327763 A1    Nov. 6, 2014

Related U.S. Application Data

(63) Continuation of application No. PCT/JP2013/051139, filed on Jan. 22, 2013.

(30) Foreign Application Priority Data

Jan. 30, 2012    (JP) .................................. 2012-016413

(51) Int. Cl.
*G02B 3/00*    (2006.01)
*H04N 5/232*    (2006.01)
(Continued)

(52) U.S. Cl.
CPC ........... *G02B 3/005* (2013.01); *G02B 3/0043* (2013.01); *G02B 3/0056* (2013.01);
(Continued)

(58) Field of Classification Search
None
See application file for complete search history.

(56) References Cited

U.S. PATENT DOCUMENTS

| 7,292,279 B2 | 11/2007 | Yamazaki |
| 7,962,033 B2 | 6/2011 | Georgiev et al. |
| 2011/0221947 A1* | 9/2011 | Awazu ................. G02B 3/0043 348/311 |

FOREIGN PATENT DOCUMENTS

| JP | 09186917 A | 7/1997 |
| JP | 2003250080 A | 9/2003 |

(Continued)

OTHER PUBLICATIONS

Japanese Office Action dated May 26, 2015, issued in counterpart Japanese Application No. 2012-016413.
(Continued)

Primary Examiner — Andy Rao
Assistant Examiner — Tyler Edwards
(74) Attorney, Agent, or Firm — Holtz, Holtz & Volek PC (57) ABSTRACT

An image acquisition apparatus includes: an image acquisition lens that focuses light from a subject; an imaging device that detects an image signal by capturing the light focused by the image acquisition lens; and a microlens array that is provided between the imaging device and the image acquisition lens so that there is a space, in the direction of the optical axis, between the microlens array and a focal plane of the image acquisition lens, in which the microlens array is formed by setting, in an array in a direction intersecting the optical axis, a plurality of microlenses that each focus incident light to form an image in an imaging plane of the imaging device and that are of two or more types having an identical focal distance and different effective diameters.

9 Claims, 10 Drawing Sheets (51) Int. Cl.
*H04N 13/02* (2006.01)
*H04N 13/04* (2006.01)
*G02B 27/00* (2006.01)
*H04N 9/04* (2006.01)

(52) U.S. Cl.
CPC ..... *G02B 27/0075* (2013.01); *H04N 5/23212* (2013.01); *H04N 9/045* (2013.01); *H04N 13/0232* (2013.01); *H04N 13/0257* (2013.01); *H04N 13/0406* (2013.01); *H04N 13/025* (2013.01); *H04N 13/0271* (2013.01)

(56) References Cited

FOREIGN PATENT DOCUMENTS

| | | | |
|---|---|---|---|
| JP | 2004361611 A | | 12/2004 |
| JP | 2007103590 A | * | 4/2007 |
| JP | 2011095027 A | * | 5/2011 |
| JP | 4752031 B2 | | 8/2011 |
| WO | 2011061998 A1 | | 5/2011 |

OTHER PUBLICATIONS

International Search Report (ISR) dated May 7, 2013 issued in International Application No. PCT/JP2013/051139.
Ng et al, "Light Field Photography with a Hand-held Plenoptic Camera", Stanford Tech. Report CTSR 2005-02, 11 Pages (in English).

* cited by examiner

IMAGE ACQUISITION APPARATUS

CROSS-REFERENCE TO RELATED APPLICATIONS

This is a continuation of International Application PCT/JP2013/051139, with an international filing date of Jan. 22, 2013, which is hereby incorporated by reference herein in its entirety. This application is based on Japanese Patent Application No. 2012-016413, the contents of which are incorporated herein by reference.

TECHNICAL FIELD

The present invention relates to an image acquisition apparatus.

BACKGROUND ART

In the related art, there are known image acquisition apparatuses that perform distance measurement (for example, see Patent Literature (PTL) 1).

Such an image acquisition apparatus is provided with a microlens array that is located between an image acquisition lens that focuses light from a subject and an imaging device that captures the light focused by the image acquisition lens, at a position between a real image formed by the image acquisition lens and the imaging device.

The light focused by the image acquisition lens is formed into a real image and is then imaged at different positions in an imaging plane of the imaging device by microlenses constituting the microlens array. As a result, parallax images are acquired for the respective microlenses. Then, stereo matching is performed for the acquired parallax images, thus measuring the distance to the subject.

CITATION LIST

Patent Literature

{PTL 1} Japanese Unexamined Patent Application, Publication No. Hei 09-186917

SUMMARY OF INVENTION

Technical Problem

The distance resolution is proportional to the diameter of the microlenses, and, on the other hand, the measurable-distance range is inversely proportional to the diameter of the microlens array. Therefore, in the image acquisition apparatus disclosed in PTL 1, if the spatial resolution is maintained, an improvement in the distance resolution and an expansion in the distance measurement range have a trade-off relation in terms of the diameter of the microlenses, and thus it is impossible to acquire an image signal that can realize both wide-measurement-range distance measurement and high-resolution distance measurement.

The present invention provides an image acquisition apparatus that can acquire an image signal that can realize both wide-measurement-range distance measurement and high-resolution distance measurement if the spatial resolution is maintained.

Solution to Problem

One aspect of the present invention is an image acquisition apparatus including: an image acquisition lens that focuses light from a subject; an imaging device that detects an image signal by capturing the light focused by the image acquisition lens; and a microlens array that is provided between the imaging device and the image acquisition lens so that there is a space, in the direction of an optical axis, between the microlens array and a focal plane of the image acquisition lens, in which the microlens array is formed by setting, in an array in directions intersecting the optical axis, a plurality of microlenses that each focus incident light to form an image in an imaging plane of the imaging device and that are of two or more types having an identical focal distance and different effective diameters.

According to the image acquisition apparatus of this aspect, light from the subject focused by the image acquisition lens is formed into a real image in a focal plane of the image acquisition lens, then enters the microlens array, which is located so that there is a space between the microlens array and the focal plane in the direction of the optical axis, and is imaged onto the imaging plane of the imaging device individually by the microlenses constituting the microlens array. Thus, a plurality of images of the subject corresponding to the microlenses are acquired in the imaging device. Because the acquired images have parallax, the distance to the subject can be calculated through stereo matching.

In this case, according to the image acquisition apparatus of this aspect, because the microlens array is formed by arraying a plurality of types of microlenses having different effective diameters, distance information that has a high spatial resolution and a narrow measurement range can be acquired by the microlenses having large effective diameters, and distance information that has a low spatial resolution and a wide measurement range can be acquired by the microlenses having small effective diameters. As a result, it is possible to acquire an image having both those pieces of distance information and to acquire an image signal that can realize both wide-measurement-range distance measurement and high-resolution distance measurement if the spatial resolution is maintained.

In the above-described aspect, the microlens array may be formed by arraying the microlenses of two types such that the microlenses of one type are sandwiched by the microlenses of the other type.

By doing so, the distance information at the position of a microlens of one type can be accurately interpolated by the distance information at the positions of the other type of microlenses that sandwich that microlens.

For example, when the effective diameter of each microlens of one type is smaller than the effective diameter of each microlens of the other type, the resolution of distance information obtained via the microlens of one type is lower than the resolution of distance information obtained via the microlens of the other type. However, through interpolation with high-resolution distance information obtained via the other type of microlenses that sandwich the microlens of one type from both sides, high-resolution distance information can be obtained.

On the other hand, when the effective diameter of each microlens of one type is larger than the effective diameter of each microlens of the other type, the range of distance information obtained via the microlens of one type is narrower than the range of distance information obtained via the microlens of the other type. However, through interpolation with wide-range distance information obtained via the other type of microlenses that sandwich the microlens of one type from both sides, out-of-range distance information that cannot be obtained via the microlens of one type can be obtained.

Furthermore, in the above-described aspect, the microlens array may be formed by arraying the microlenses of two types such that the microlenses of one type are sandwiched by the microlenses of the other type from two different directions.

By doing so, the distance information at the position of a microlens of one type can be more accurately interpolated by the distance information at the positions of the other type of microlenses that sandwich that microlens.

Furthermore, in the above-described aspect, each of the microlenses may be provided with an aperture that determines an effective diameter of the each of the microlenses.

By doing so, the effective diameter can be determined not by the size of the microlense itself but by the size of the aperture.

Furthermore, in the above-described aspect, a distance-information calculating unit that calculates distance information by using image signals detected by the imaging device may be further included.

By doing so, the distance-information calculating unit calculates a plurality of types of distance information by using a plurality of types of image signals detected by the imaging device via a plurality of types of microlenses having different effective diameters, thereby making it possible to realize both wide-measurement-range distance measurement and high-resolution distance measurement.

Furthermore, in the above-described aspect, the distance-information calculating unit may include: a type-based distance-information calculating part that performs stereo matching by using image signals acquired from a plurality of pixels assigned to the microlenses of the same type, respectively, thus calculating a plurality of types of distance information, for the respective types of microlenses; and an interpolation part that uses distance information of one type calculated by the type-based distance-information calculating part to interpolate distance information of the other type.

By doing so, when an image signal is detected by the imaging device, the type-based distance-information calculating part performs stereo matching by using image signals acquired from a plurality of pixels assigned to the microlenses of the same type, thus calculating a plurality of types of distance information, for the respective types of microlenses. Then, the interpolation part uses distance information of one type to interpolate distance information of the other type, thereby making it possible to realize both wide-measurement-range distance measurement and high-resolution distance measurement.

Furthermore, in the above-described aspect, the interpolation part may interpolate distance information calculated by using an image signal acquired from a pixel assigned to a microlens having a smaller effective diameter by using distance information calculated by using an image signal acquired from a pixel assigned to a microlens having a larger effective diameter.

By doing so, low-resolution distance information calculated by using an image signal acquired from a pixel assigned to a microlens having a smaller effective diameter is interpolated with high-resolution distance information calculated by using an image signal acquired from a pixel assigned to a microlens having a larger effective diameter, thus making it possible to acquire a highly-accurate image signal as a whole.

Furthermore, in the above-described aspect, a light blocking member for blocking light so as to prevent light passing through any of the microlenses from entering pixels corresponding to microlenses adjacent to the microlens may be further included.

By doing so, light passing through adjacent microlenses can be blocked by the light blocking member, thus making it possible to prevent the occurrence of crosstalk in the imaging device.

Advantageous Effects of Invention

According to the present invention, an advantageous effect is afforded in that it is possible to acquire an image signal that can realize both wide-measurement-range distance measurement and high-resolution distance measurement if the spatial resolution is maintained.

DESCRIPTION OF EMBODIMENT

An image acquisition apparatus 1 according to one embodiment of the present invention will be described below with reference to the drawings.

Figure 1:
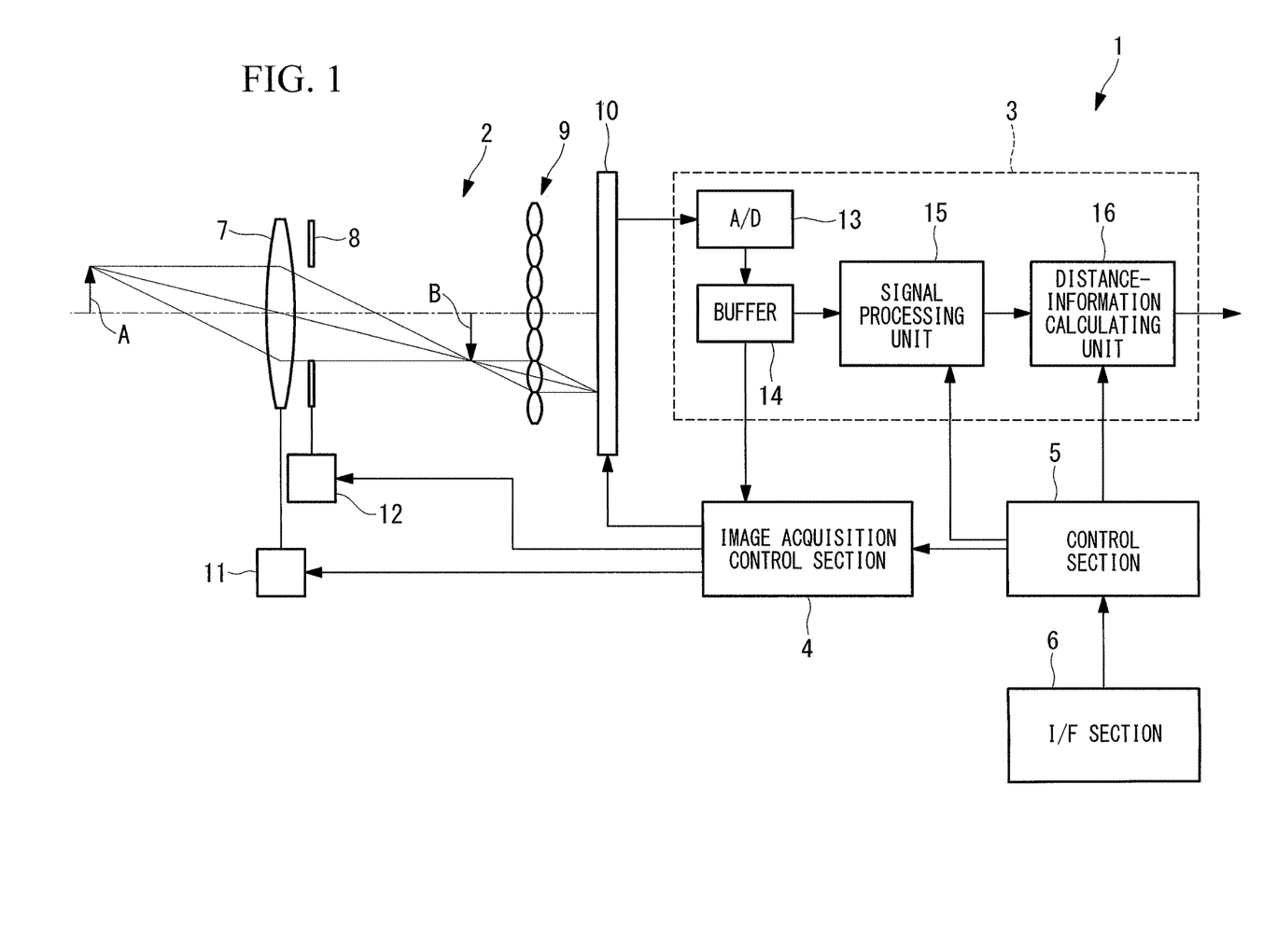
FIG. 1 is a view showing the entire configuration of an image acquisition apparatus according to one embodiment of the present invention.

As shown in FIG. 1, the image acquisition apparatus 1 according to this embodiment includes an image acquisition section 2 that captures a subject A, an image processing section 3 that processes an image signal acquired by the image acquisition section 2, an image acquisition control section 4 that controls the image acquisition section 2, a control section 5 that controls the image processing section 3 and the image acquisition control section 4, and an I/F section 6 that is used to input an external signal to the control section 5.

The image acquisition section 2 includes, in order from the subject A side, an image acquisition lens 7 that is located facing the subject A, an aperture stop 8 that determines the diameter of the light flux that has passed through the image acquisition lens 7, a microlens array 9 that is located farther way from the subject A in an optical axis direction than a real image B formed at a back focal position of the image acquisition lens 7 is, with a space between the microlens array 9 and the real image B, and an imaging device 10 that is located so that there is a space between the imaging device 10 and the microlens array 9 in the optical axis direction and that captures light that has passed through the microlens array 9.

An AF motor 11 is connected to the image acquisition lens 7. The image acquisition lens 7 is moved in the optical axis direction when the AF motor 11 is driven in response to a command signal sent from the image acquisition control section 4, so as to make a front focal position coincide with the subject A. Note that, although the image acquisition lens 7 is shown as a single lens in FIG. 1, in practice, the image acquisition lens 7 is formed of a plurality of lenses arrayed in the optical axis direction, and at least one of the lenses is moved in the optical axis direction by the AF motor 11.

An aperture adjusting motor 12 is connected to the aperture stop 8. The aperture stop 8 is adjusted in aperture size when the aperture adjusting motor 12 is driven in response to a command signal sent from the image acquisition control section 4, thereby adjusting an incident light level.

Figure 2:
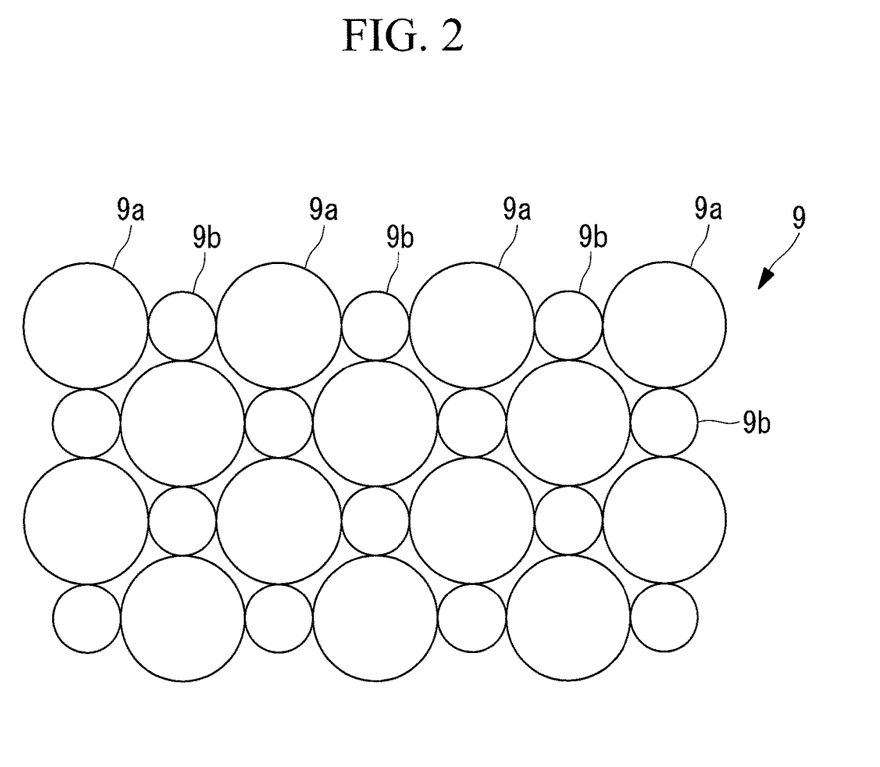
FIG. 2 is a front view showing an example microlens array provided in the image acquisition apparatus shown in FIG. 1.

As shown in FIG. 2, the microlens array 9 is formed by alternately arraying, in diameter directions, two types of microlenses 9a and 9b having different diameters. These two types of microlenses 9a and 9b have an identical focal distance and different effective diameters. By arraying the microlenses 9a and 9b in this way, the microlenses 9a and 9b have a relationship such that the large microlenses 9a are each surrounded on four sides by the small microlenses 9b, and, at the same time, the small microlenses 9b are each surrounded on four sides by the large microlenses 9a.

As a result, the microlenses 9a (9b) of one type are each sandwiched by the microlenses 9b (9a) of the other type from two directions, that is the vertical and horizontal directions.

The imaging device 10 is an RGB-primary-color single-plane CCD, for example.

As shown in FIG. 1, the image processing section 3 includes an A/D converter 13 that converts an image signal detected by the imaging device 10 into a digital signal, a buffer 14 that temporarily stores the image signal converted into the digital signal, a signal processing unit 15 that processes the single-plane image signal stored in the buffer 14, thus generating three-plane image signals, and a distance-information calculating unit 16 that calculates distance information on the distance from the image acquisition lens 7 to the subject A by using the image signal generated by the signal processing unit 15.

The signal processing unit 15 reads the single-plane image signal stored in the buffer 14 on the basis of a command signal sent from the control section 5 and generates three-plane image signals from an image signal of each of pixels that have been subjected to a known demosaicing process and white balance process.

Figure 3:
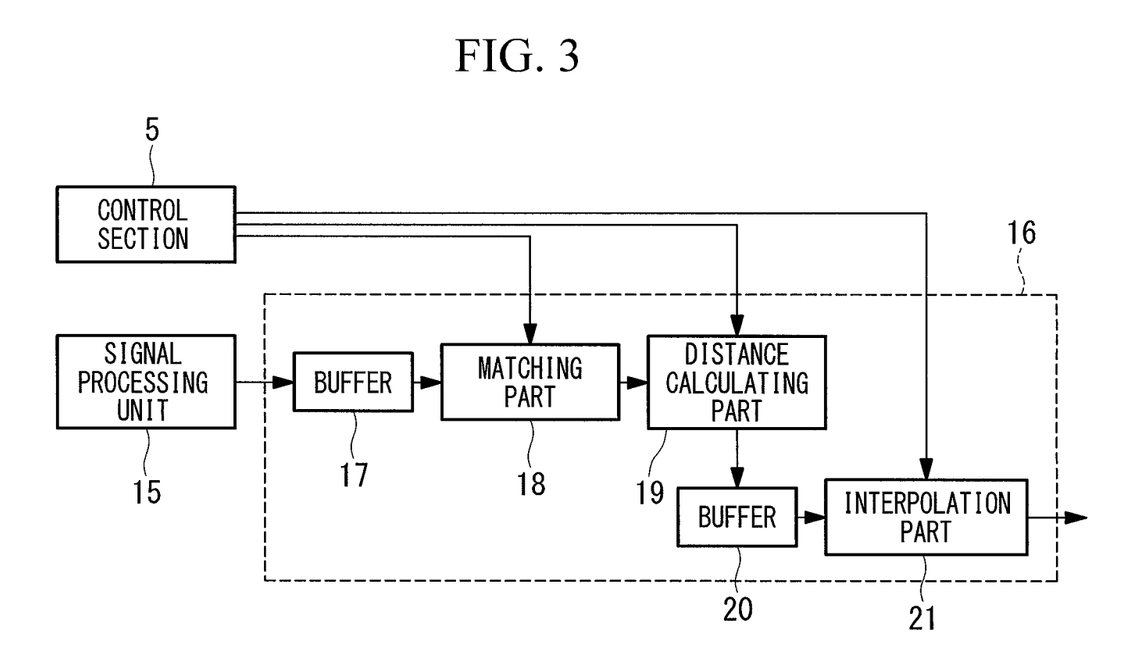
FIG. 3 is a block diagram showing a distance-information calculating unit provided in the image acquisition apparatus shown in FIG. 1.

As shown in FIG. 3, the distance-information calculating unit 16 includes a buffer 17 that temporarily stores the image signal generated by the signal processing unit 15, a matching part 18 that performs a matching process on the basis of the image signal stored in the buffer 17, a distance calculating part 19 that calculates the distances from the image acquisition lens 7 to the subject A for the respective microlenses 9a and 9b by using coordinate values obtained by the matching part, a buffer 20 that stores the distances calculated by the distance calculating part 19, and an interpolation part 21 that performs an interpolation process by using the distances stored in the buffer 20.

The matching part 18 performs a known stereo matching process by using the image signal stored in the buffer 17, to calculate corresponding coordinate values in a plurality of images having parallax.

Figure 4:
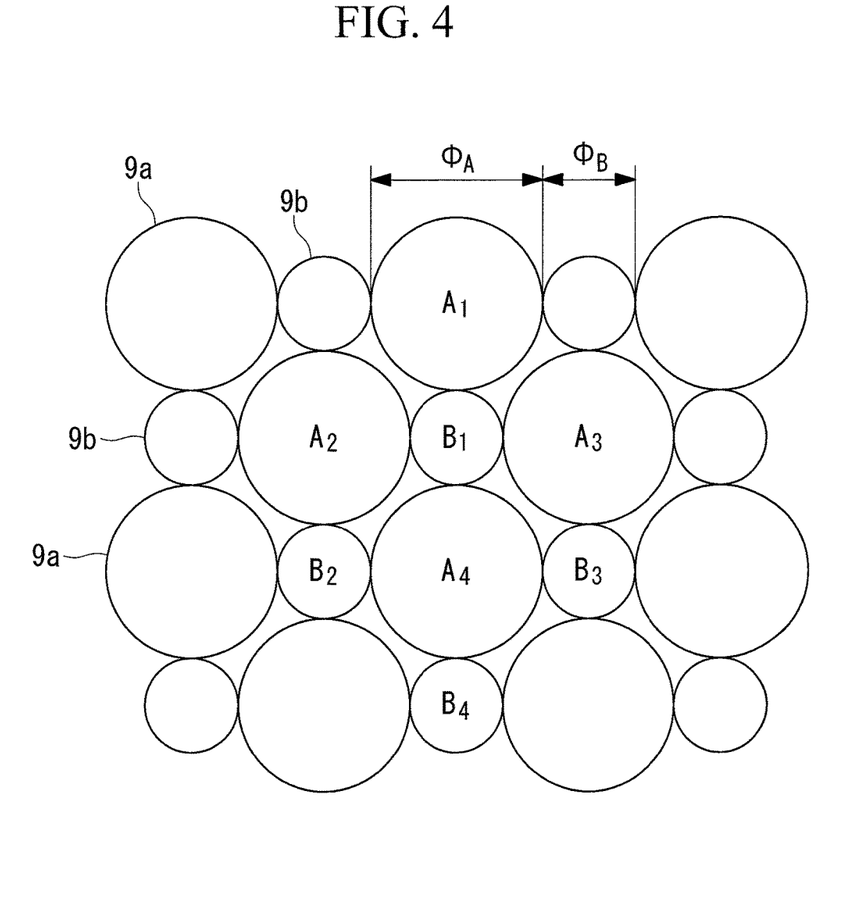
FIG. 4 is a front view for explaining the effect of the microlens array shown in FIG. 2.

Specifically, in the example shown in FIG. 4, the stereo matching process is performed by using an image that is acquired at a pixel region of the imaging device 10 corresponding to a microlens $A_2$ that is one of the larger-diameter microlenses 9a and an image that is acquired at a pixel region of the imaging device 10 corresponding to a microlens $A_3$ that is another one of the larger-diameter microlenses 9a, thus obtaining the coordinate values in the x direction of the corresponding pixels in the two pixel regions, for example.

In FIG. 4, the baseline length for the stereo matching process in the pixel regions corresponding to the microlenses $A_2$ and $A_3$ is $\Phi_A + \Phi_B$. Here, $\Phi_A$ represents the effective diameter of the larger microlens 9a, and $\Phi_B$ represents the effective diameter of the smaller microlens 9b.

The distance calculating part 19 calculates, by the following equation (1), a distance Z between the image acquisition lens 7 and the subject A by using a distance z between the microlens array 9 and the real image B and an imaging magnification M of the image acquisition lens 7.

$$Z = z/M = f \cdot (\Phi_A + \Phi_B)/(x_3 - x_2) \qquad (1)$$

Here, f represents the focal distance of the microlenses 9a and 9b, and $x_2$ and $x_3$ represent the coordinate values in the x direction of the corresponding pixels in the two pixel regions.

Furthermore, the distance calculating part 19 similarly performs the stereo matching process for microlenses $B_2$ and $B_3$, which are the smaller microlenses 9b, to calculate the distance Z between the image acquisition lens 7 and the subject A.

Here, a description will be given of a distance resolution $\Delta z$ and a distance measurement range $\Delta R$ with reference to FIG. 5.

Figure 5:
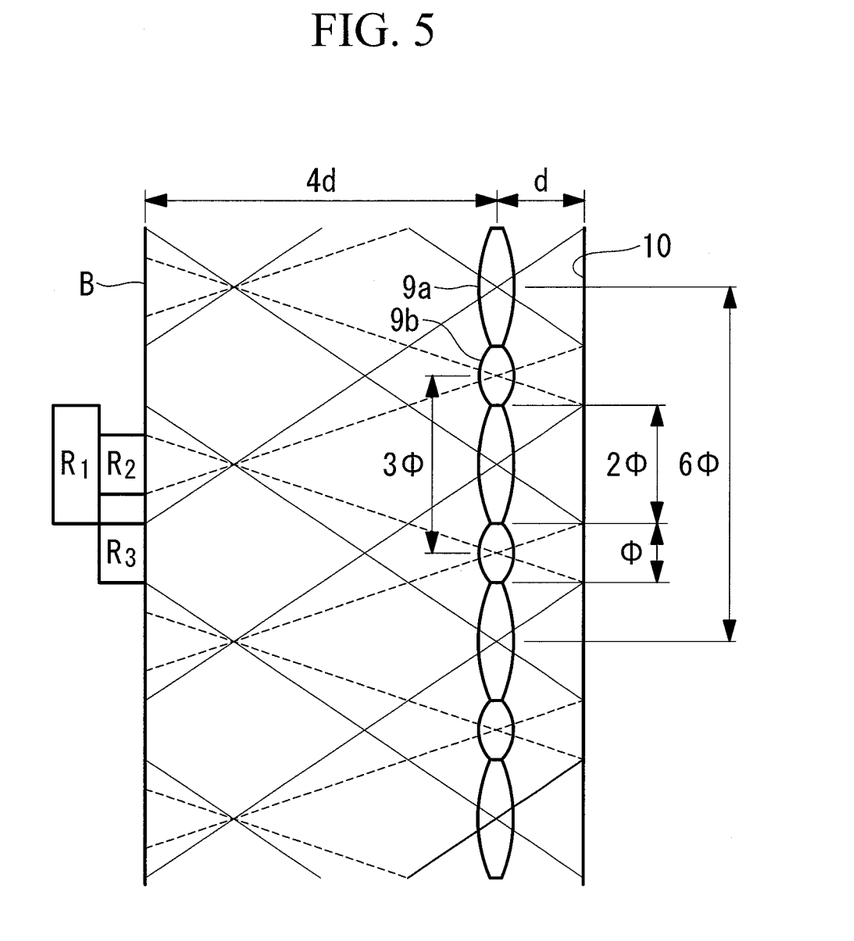
FIG. 5 is a side view for explaining the effect of the microlens array shown in FIG. 2.

In FIG. 5, the imaging magnification of the microlenses 9a and 9b is $d/4d = 1/4$. When the diameter of the smaller microlens 9b is $\Phi$, and the diameter of the larger microlens 9a is $2\Phi$, the baseline length for a region $R_1$ is $6\Phi$, and the baseline length for each of regions $R_2$ and $R_3$ is $3\Phi$.

Distance resolutions $\Delta z_{R1}$, $\Delta z_{R2}$, and $\Delta z_{R3}$ at the regions $R_1$, $R_2$, and $R_3$ are calculated by the following equations (2).

$$\Delta z_{R1} = \epsilon_\mu \cdot Z/6\Phi$$

$$\Delta z_R = \Delta z_{R3} = \epsilon_\mu \cdot Z/3\Phi \qquad (2)$$

Here, $\epsilon_\mu$ represents an error in a corresponding point in the stereo matching process.

From Equations (2), it is found that the ratio of the distance resolution $\Delta z_{R1}$ at the region $R_1$ and each of the distance resolutions $\Delta z_{R2}$ and $\Delta z_{R3}$ at the regions $R_2$ and $R_3$ is 1:2.

Furthermore, as shown in FIG. 5, the microlenses 9a, which have a diameter of $2\Phi$, form parallax images of the regions $R_1$ and $R_3$, and the microlenses 9b, which have a diameter of $\Phi$, form parallax images of the regions $R_2$. Thus, the distance measurement ranges $\Delta R_{R1}$, $\Delta R_{R2}$, and $\Delta R_{R3}$ are obtained by the following Equations (3).

From Equations (3), it is found that the distance measurement range $\Delta z_{R2}$ at the region $R_2$ is the longest.

$$\Delta R_{R1} = \Delta R_{R3} = (Z^2 \cdot \delta \cdot F \cdot S)/(f^2 \cdot 2\Phi + Z \cdot \delta F \cdot S) + (Z^2 \cdot \delta \cdot F \cdot S)/(f^2 \cdot 2\Phi - Z \cdot \delta \cdot F \cdot S)$$

$$\Delta R_{R2} = (Z^2 \cdot \delta \cdot F \cdot S)/(f^2 \cdot \Phi + Z \cdot \delta \cdot F \cdot S) + (Z^2 \cdot \delta \cdot F \cdot S)/(f^2 \cdot \Phi - Z \cdot \delta \cdot F \cdot S) \quad (3)$$

Figure 6:
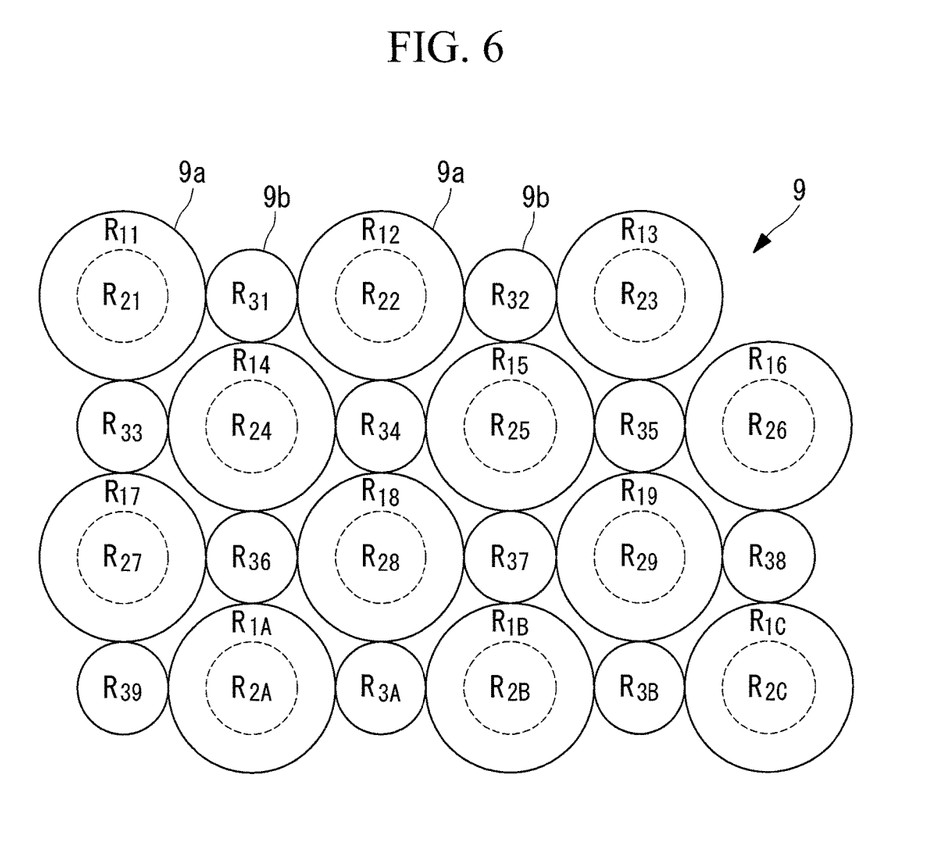
FIG. 6 is a view for explaining processing in an interpolation part provided in the distance-information calculating unit shown in FIG. 1.

The interpolation part 21 uses distance information $Z_{R1n}$ of regions $R_{1n}$ (n=1, 2, ..., C), shown in FIG. 6, whose performance in terms of the distance resolutions $\Delta Z$ is high, to interpolate distance information $Z_{R3n}$ of a region $R_{3n}$ (n=1, 2, ..., B) that is sandwiched between the regions $R_{1n}$, as shown in the following Equation (4). Equation (4) shows a case in which the distance information $Z_{R34}$ is interpolated, for example.

$$Z_{R34} = (Z_{12} + Z_{R14} + Z_{R15} + Z_{R18})/4 \quad (4)$$

Here, $Z_{R34}$, $Z_{R12}$, $Z_{R14}$, $Z_{R15}$, and $Z_{R18}$ represent distance information of regions $R_{34}$, $R_{12}$, $R_{14}$, $R_{15}$, and $R_{18}$.

Although Equation (4) shows a case in which the distance information $Z_{R34}$ of the region $R_{34}$ is interpolated, the interpolation part 21 performs a similar process for another region $R_{3n}$ to interpolate the distance information $Z_{R3n}$ thereof.

Furthermore, the interpolation part 21 uses distance information $Z_{R2n}$ of regions $R_{2n}$ (n=1, 2, ..., C), whose distance measurement ranges $\Delta R$ are wide, to interpolate distance information $Z_{R1n}$ and $Z_{R3n}$ of the regions $R_{1n}$ and $R_{3n}$, as shown in the following Equations (5). Equations (5) show a case in which items of distance information $Z_{R15}$ and $Z_{R34}$ are interpolated, for example.

$$Z_{R15} = Z_{R25}$$

$$Z_{R34} = (Z_{R22} + Z_{R24} + Z_{R25} + Z_{R28})/4 \quad (5)$$

Here, $Z_{R15}$, $Z_{R22}$, $Z_{R24}$, $Z_{R25}$, $Z_{R28}$, and $Z_{R34}$ represent distance information of the regions $R_{15}$, $R_{22}$, $R_{24}$, $R_{25}$, $R_{28}$, and $R_{34}$.

Although Equations (5) show a case in which the items of distance information $Z_{R15}$ and $Z_{R34}$ of the regions $R_{15}$ and $R_{34}$ are interpolated, the interpolation part 21 performs a similar process for other regions $R_{1n}$ and $R_{3n}$ to interpolate the distance information $Z_{R1n}$ and $Z_{R3n}$ thereof.

The effect of the thus-configured image acquisition apparatus 1 of this embodiment will be described below.

In order to measure the distance Z between the subject A and the image acquisition lens 7 by using the image acquisition apparatus 1 according to this embodiment, after the image capturing conditions, such as the ISO sensitivity and the exposure, are set via the I/F section 6, a shutter button (not shown) is pressed halfway, thereby entering a pre-capturing mode. Light from the subject A enters the image acquisition section 2 via the image acquisition lens 7, forms the real image B, is collected by the microlens array 9, and is then captured by the imaging device 10. An image signal acquired by the imaging device 10 is converted into a digital signal by the A/D converter 13 and is transferred to and stored in the buffer 14.

The image signal stored in the buffer 14 is sent to the image acquisition control section 4. The image acquisition control section 4 controls the aperture adjusting motor 12 of the aperture stop 8 by using a luminance level of the received image signal and controls the electronic shutter speed of the imaging device 10. Furthermore, the image acquisition control section 4 controls the AF motor 11 of the image acquisition lens 7, calculates a contrast value in a predetermined region from the image signal, and sets the image acquisition lens 7 at a predetermined focal distance so that the contrast value becomes the maximum.

In this state, the shutter button is pressed all the way, thus performing true capturing. The true capturing is performed on the basis of the focal distance and the exposure condition obtained in the image acquisition control section 4, and an acquired image signal is converted into a digital signal by the A/D converter 13 and is transferred to and stored in the buffer 14. Then, the image signal in the buffer 14 is transferred to the signal processing unit 15.

The signal processing unit 15 generates three-plane image signals individually having R, G, and B pixels obtained after a known demosaicing process and white balance process have been applied to the single-plane image signal transferred from the buffer 14. The generated image signals are transferred to the distance-information calculating unit 16.

In the distance-information calculating unit 16, the image signals sent from the signal processing unit 15 are stored in the buffer 17. Then, in the matching part 18, a known stereo matching process for the subject A is applied to image signals stored in the buffer 17, thus calculating the corresponding coordinate values in a plurality of parallax images. At this time, the corresponding coordinate values are calculated through the stereo matching process applied to image signals captured in the imaging device 10 at pixel regions corresponding to microlenses 9a and 9b of the same types via the microlenses 9a and 9b.

The distance calculating part 19 calculates the distance from the image acquisition lens 7 to the subject A by using the coordinate values calculated in the matching part 18.

Distance information Z calculated for pixel regions corresponding to the microlenses 9a and 9b of the same types is transferred to the buffer 20 and is then transferred to the interpolation part 21, where it is interpolated.

Specifically, according to the image acquisition apparatus 1 of this embodiment, because the microlens array 9, which is formed by alternately arraying the two types of the microlenses 9a and 9b having different effective diameters, is used, high-resolution distance measurement can be performed from an image signal acquired by the imaging device 10 via the larger microlens 9a, and wide-range distance measurement can be performed from an image signal acquired by the imaging device via the smaller microlens 9b. As a result, there is the advantage that, if the spatial resolution is maintained, it is possible to acquire an image signal that can realize both wide-measurement-range distance measurement and high-resolution distance measurement.

Furthermore, according to the image acquisition apparatus 1 of this embodiment, because the distance calculating part 19 calculates, from the acquired image signal, the distance for the microlenses 9a and 9b of each type, and the interpolation part 21 performs the interpolation process so as to make up for the distance performances of the respective types, if the spatial resolution is maintained, it is possible to realize both wide-measurement-range distance measurement and high-resolution distance measurement.

Furthermore, according to the image acquisition apparatus 1 of this embodiment, because the two types of microlenses 9a and 9b are alternately arrayed such that microlenses of one type sandwich microlenses of the other type in two directions, that is the vertical and horizontal directions, there is the advantage that the distance information on the basis of the image signal acquired via the sandwiched microlens 9a or 9b can be interpolated more accurately by using the distance information on the basis of the image signals acquired via the surrounding four microlenses 9b or 9a.

Note that, in this embodiment, although the microlens array 9 is formed of the two types of microlenses 9a and 9b having different diameters, instead of this, the microlens array 9 may be formed by arraying three or more types of microlenses.

Furthermore, in order to make the effective diameters of the microlenses 9a and 9b different, the two types of microlenses 9a and 9b having different diameters are set in an array; however, instead of this, it is possible to provide the microlenses 9a and 9b with apertures for determining the effective diameters of the microlenses, to make the sizes of the apertures different, thereby making the effective diameters of the microlenses 9a and 9b different.

Figure 7:
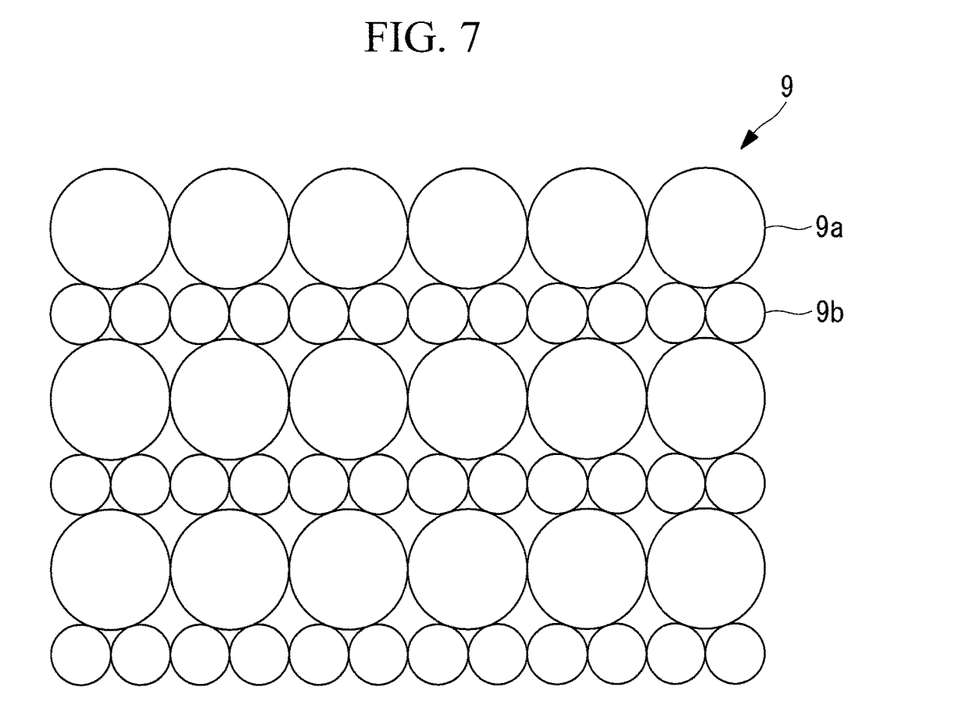
FIG. 7 is a front view for explaining another arrangement example of the microlens array shown in FIG. 2.
Figure 8:
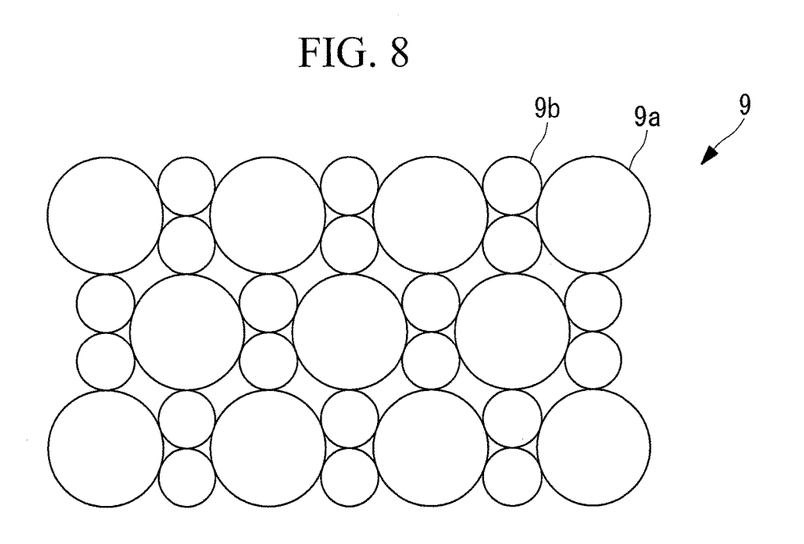
FIG. 8 is a front view for explaining still another arrangement example of the microlens array shown in FIG. 2.
Figure 9:
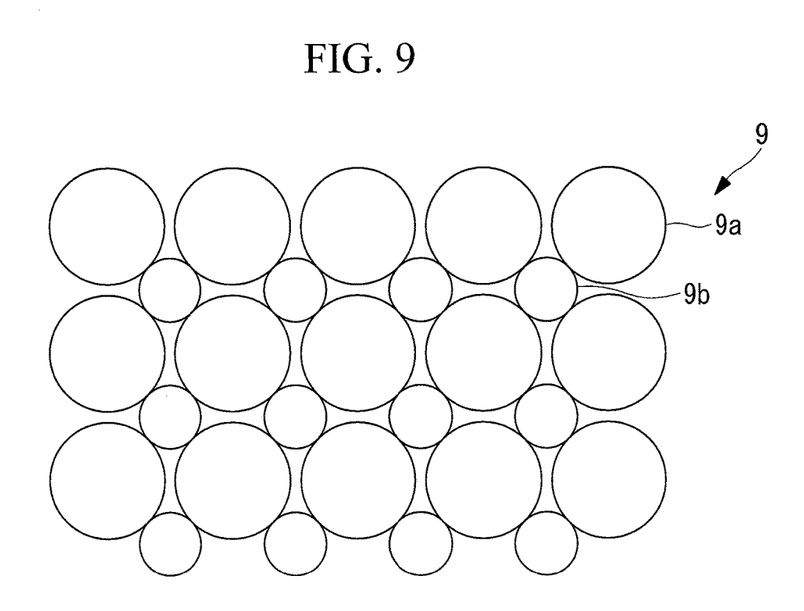
FIG. 9 is a front view for explaining still another arrangement example of the microlens array shown in FIG. 2.

Furthermore, in this embodiment, although the microlens array 9 is formed by arraying the microlenses 9b of one type in a zigzag manner so as to fill gaps between the microlenses 9a of the other type, which are also arrayed in a zigzag manner, instead of this, other arrangements may be adopted, as shown in FIGS. 7 to 9. In the arrangements shown in FIGS. 2 and 9, the array directions of the microlenses 9a and 9b with respect to the imaging device 10 are different.

Figure 10:
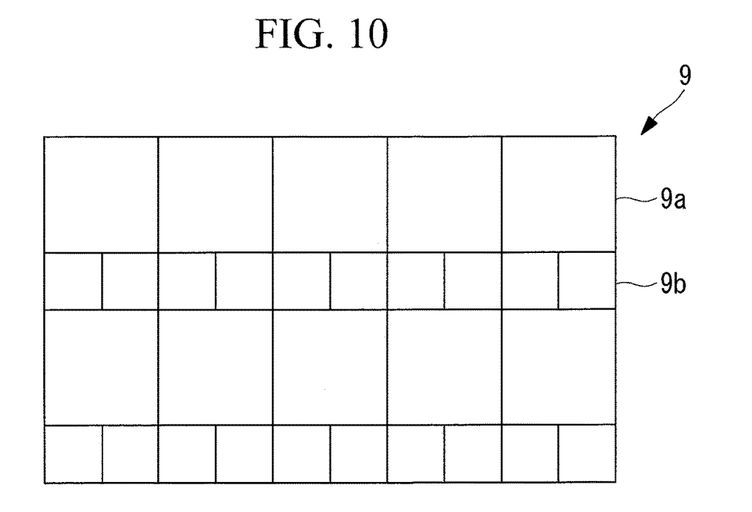
FIG. 10 is a front view for explaining another form of the microlens array shown in FIG. 2.
Figure 11:
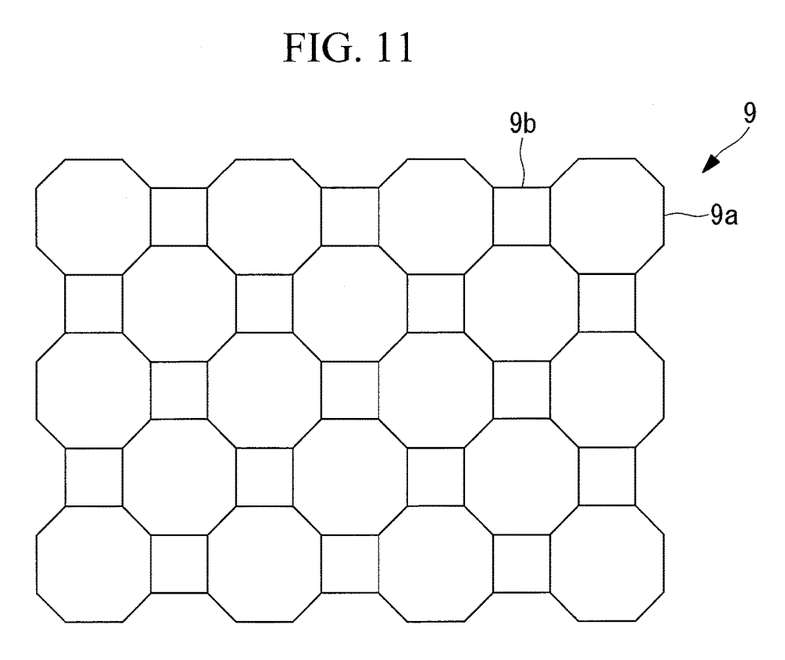
FIG. 11 is a front view for explaining another form of the microlens array shown in FIG. 2.

Furthermore, although the microlens array 9 is formed by arraying the circular microlenses 9a and 9b, instead of this, the microlens array 9 may be formed by arraying rectangular microlenses shown in FIG. 10 or octagonal microlenses and tetragonal microlenses shown in FIG. 11.

Figure 12:
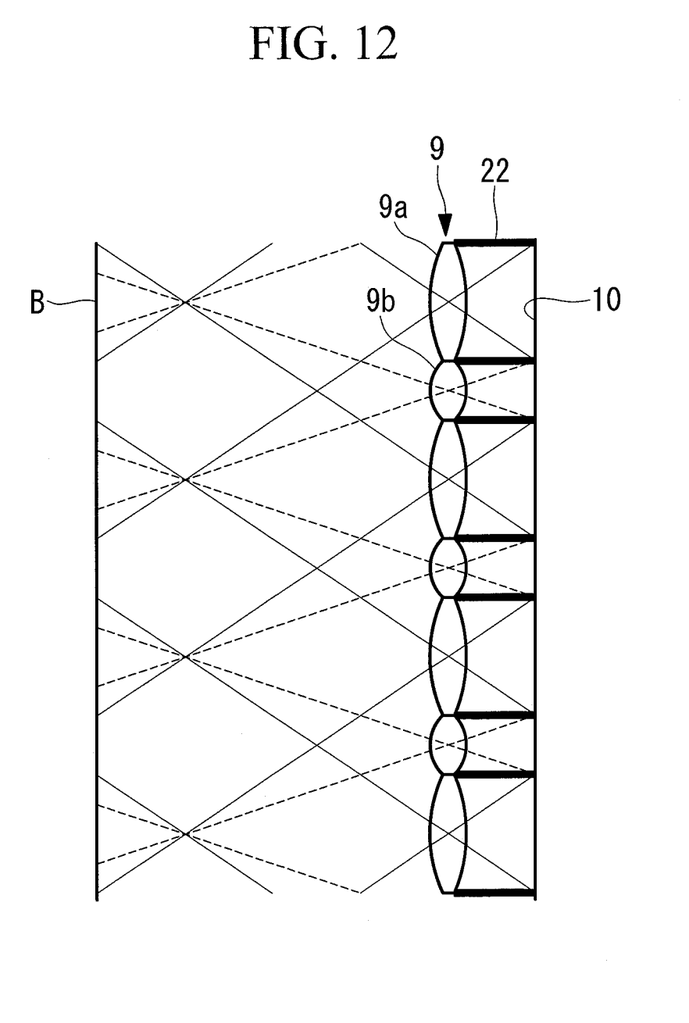
FIG. 12 is a side view showing a modification of the microlens array shown in FIG. 5.

Furthermore, depending on the F-number of the image acquisition lens 7, in order to prevent the occurrence of crosstalk in the imaging device 10, light blocking members 22 for partitioning the space between the microlens array 9 and the imaging device 10 may be provided, as shown in FIG. 12. By doing so, light passing through each microlens 9a or 9b can be prevented from entering the imaging device 10 at pixel regions corresponding to adjacent microlenses 9b or 9a, thus suppressing the occurrence of crosstalk. The light blocking members 22 may be directly attached to the microlenses 9a and 9b and the imaging device 10.

Furthermore, in this embodiment, although a CCD is shown as an example of the imaging device 10, instead of this, a CMOS image sensor may be adopted.

Furthermore, the signal processing unit 15 generates three-plane image signals individually having R, G, and B pixels obtained after a known demosaicing process and white balance process have been applied; however, instead of this, the three-plane image signals may be further converted into YCbCr signals by using Equation (6).

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix} \quad (6)$$

Furthermore, in this embodiment, although the distance information acquired via each microlens 9a of one type is interpolated with the distance information acquired via the other type of microlenses 9b that are arrayed on four sides of the microlens 9a, instead of this, the distance information acquired via each microlens 9a of one type may be interpolated with the distance information acquired via the other type of microlenses 9b that are arrayed on two sides of the microlens 9a, or the distance information acquired via each microlens 9a of one type may be interpolated with the distance information acquired via the other type of microlenses 9b that are arrayed on eight sides of the microlens 9a.

REFERENCE SIGNS LIST

A subject
1 image acquisition apparatus
7 image acquisition lens
9 microlens array
9a, 9b microlens
10 imaging device
16 distance-information calculating unit
19 distance calculating part (type-based distance-information calculating part)
21 interpolation part
22 light blocking member

The invention claimed is:

1. An image acquisition apparatus comprising:
   an image acquisition lens that focuses light from a subject;
   an imaging device that detects an image signal by capturing the light focused by the image acquisition lens; and
   a microlens array that is provided between the imaging device and the image acquisition lens so that there is a space, in the direction of an optical axis, between the microlens array and a focal plane of the image acquisition lens,
   wherein a space is provided, in the direction of the optical axis, between the microlens array and the imaging device, and
   wherein the microlens array is formed by setting, in an array in a direction intersecting the optical axis, a plurality of microlenses that each re-form a first image that has been formed in the focal plane by the image acquisition lens into a second image on an imaging plane of the imaging device and that are of two or more types having an identical focal distance and different effective diameters.

2. An image acquisition apparatus according to claim 1, wherein the microlens array is formed by arraying the microlenses of two types such that the microlenses of one type are sandwiched by the microlenses of the other type.

3. An image acquisition apparatus according to claim 2, wherein the microlens array is formed by arraying the microlenses of two types such that the microlenses of one type are sandwiched by the microlenses of the other type from two different directions.

4. An image acquisition apparatus according to claim 1, wherein each of the microlenses is provided with an aperture that determines an effective diameter of the each of the microlenses.

5. An image acquisition apparatus according to claim 1, further comprising a light blocking member for blocking light so as to prevent light passing through any of the microlenses from entering pixels corresponding to microlenses adjacent to the microlens.

6. An image acquisition apparatus according to claim 1, wherein a plurality of pixels is assigned to each of the plurality of microlenses.

7. An image acquisition apparatus according to claim 1, further comprising:
   a type-based distance-information calculating part that performs stereo matching by using image signals detected by the imaging device and acquired from a plurality of pixels assigned to the microlenses of the same type, respectively, thus calculating a plurality of types of distance information, for the respective types of microlenses; and
   an interpolation part that uses distance information of one type calculated by the type-based distance-information calculating part to interpolate distance information of the other type.

8. An image acquisition apparatus according to claim 1, wherein the microlens array is located between the imaging device and the focal plane of the image acquisition lens in such a way that light that has been passed through the focal plane is imaged onto the imaging plane of the imaging device individually by each of the plurality of microlenses.

9. An image acquisition apparatus according to claim 7, wherein the interpolation part interpolates distance information calculated by using image signals acquired from pixels assigned to microlenses having a smaller effective diameter by using distance information calculated by using image signals acquired from pixels assigned to microlenses having a larger effective diameter.

\* \* \* \* \*